United States Patent Office 2,744,869
Patented May 8, 1956

2,744,869

DRILLING FLUID FOR HIGH-TEMPERATURE WELLS

Henry C. H. Darley, Bellaire, Tex., assignor to Shell Development Company, New York, N. Y., a corporation of Delaware No Drawing. Application November 23, 1953,
Serial No. 393,919

10 Claims. (Cl. 252—8.5)

This invention relates to a method of drilling high-temperature wells and pertains more particularly to a drilling fluid to be used in high-temperature wells which does not solidify when left in the well without being circulated or agitated over relatively long periods of time, such as several weeks or several months.

Over the past several years, oil producers have expended considerable time and money to discover oil reservoirs at much deeper horizons than those being commercially produced at present. The drilling of deeper wells has raised a multitude of new drilling, logging and production problems. One of the most critical problems encountered is the maintenance of a satisfactory drilling mud composition under the high-temperature conditions encountered in deep wells.

Conventional lime-base drilling muds have been favored for deep well drilling for a number of years because of their tolerance of high-solids content, their low thixotropy, their stability toward contaminants, and their ease of maintenance. These lime-base muds have been used very successfully in drilling operations where high well temperatures are not encountered, but at the very high temperatures of modern deep wells, this type of drilling mud has been found to be inadequate for the role required of a satisfactory drilling fluid to be used in deep drilling operations where formation temperatures of above 225° F. are encountered.

Lime muds have been used almost exclusively in the Gulf Coast area for deep drilling in moderately high-temperature wells. These muds consist of lime, caustic soda and an organic thinner such as quebracho, lignite, or a ligno-sulfonate. Starch is often added to improve the filtration properties. The essential function of the lime in this system may be said to be its ability to repress the tendency, caused by the thinner and the caustic soda, of the mud clays to swell or disperse. By this it is meant that a drilling mud containing calcium hydroxide can absorb more drill cuttings before it is necessary that the mud be thinned with water, and at the same time can tolerate higher concentrations of sodium hydroxide which make the mud resistant to contamination by salt, gypsum, etc.

It has been found in deep drilling operations that the conventional lime-base drilling mud often becomes semi-solid or solid near the bottom of the borehole when the circulation of the mud in the hole is discontinued for a period of several hours. This phenomena is well known to those in the art of drilling and it has been established by mean osf X-ray analysis that both caustic soda and lime react chemically with the clay minerals of the drilling mud at elevated temperatures. It has been suggested that the hydrated alumino-silicates and silicates so formed caused solidification of the mud by a mechanism similar to that of setting of cement. To date, however, no satisfactory remedy has been suggested to prevent the setting up of muds besides the one presently used which consists of adding an excess of organic thinner to the mud. This treatment of the mud merely retards, rather than prevents, solidification and it is the considered opinion of production men in the field that better remedies must be developed if wells are to be drilled deeper in the future.

When the lime-base mud solidifies or partially solidifies in the borehole, logging tools or perforating guns cannnot be successfully run to the bottom of the borehole and it often becomes necessary to wash or ream the hole to the bottom. In addition, it has been found that well maintenance operations are difficult and expensive when a lime-base mud has been placed above a production packer. For example, in one 15,700 foot well in Louisiana which was completed with a lime-base mud left in the annulus between the production string and well casing, it was found that the mud in the lower part of the borehole had set up or solidified. Thus, when it was necessary to pull a corroded tubing string out of the well it was impossible to circulate the mud out of the annulus and it was necessary to drill out the solidified mud from the bottom of the hole with a rotary washover shoe.

It is, therefore, the primary object of this invention to provide a satisfactory method of drilling deep wells wherein high temperatures are encountered.

It is also an object of this invention to provide a drilling mud capable of having a high solids content which functions satisfactorily at the high temperatures where conventional lime-base muds have proved to be unsatisfactory.

A further object of this invention is to provide a fluid or a drilling mud of high solids content which may be left in the annulus between the production string and the well casing, when a high temperature well is completed, without the fluid solidifying in any part of the well.

Another object of this invention is to provide a drilling fluid for use in high-temperature wells which is not affected to any great extent by brine or other contaminants normally encountered in the drilling of deep wells.

These and other objects of this invention will be understood from the following detailed description of the invention.

The lime-base muds own their properties fundamentally to the flocculating power of the calcium ion which aggregates and dehydrates the clay particles in a mud. Thus, what may be called the effective volume of the clay phase in a mud is reduced, which enables the mud to tolerate higher solids content without its viscosity becoming objectionably high. The calcium ion also tends to set up a gel structure, but this can be prevented by the use of one of the common organic thinners, quebracho, lignite, etc., provided the concentration of the calcium ion in the aqueous phase is kept at a low value by the use of sodium hydroxide. Sodium hydroxide and quebracho tend to disperse the clay particles so that there is a balance of opposing forces in a lime mud, sodium hydroxide and quenbracho tending to increase the effective clay volume while reducing the shear strength of the mud, and the calcium hydroxide tending to reduce the effective clay volume while increasing the shear strength. There is no experimental evidence to show that the action of a thinner in a lime-base mud is different from that with sodium muds.

Thus, the main characteristics of lime-base muds are caused by the flocculating action of the calcium ions, which is governed by their concentration in the aqueous phase of the mud. The beneficial effects of the addition of lime to a mud are entirely offset in high-temperature wells by the fact that a lime-base mud tends to set up and become a plastic mass or, at other times, solidifies in the well when allowed to stand without agitation or circulation for long periods of time.

The present invention can be practiced by adding small amounts of barium hydroxide to drilling fluids of the water-base type, or of the oil-in-water emulsion type which may or may not contain an emulsifying agent, which drilling fluids are to be employed in a high-temperature well either for drilling or completion purposes. The incorporation of small amounts of barium hydroxide in a drilling mud to be used in high-temperature wells yields a mud having all the desirable characteristics of a lime-base mud without its undesirable charactertisics of solidifying at high temperatures. The requisite amounts of sodium hydroxide and a thinner such as quebracho, lignite, tannins, or soft brown coal may be added in the same manner that they are added to lime-base muds. Thus a high-temperature drilling mud incorporating small amounts of barium hydroxide therein remains plastic at all times even though subjected to high temperatures over long periods of time. At the same time, the above-described water-base drilling fluids possess an excellent tolerance for a high solids content, good plastering qualities, a suitable thixotropic gel structure, and exhibits high resistance to contamination by formation brines.

Drilling fluids relevant to this invention may be considered to consist fundamentally of two components, a continuous phase which is water, and a discontinuous phase dispersed therein which is clay. The clay provides the rheological and plastering properties by increasing the fluid density and assists, to a limited extent, in providing hydrostatic control of the formation pressures encountered. As far as present knowledge permits, the clay minerals, which are the active constituents of clays as they occur in nature, may be described as complex inorganic hydrated silicates, such as aluminum and magnesium silicates, having the ability to adsorb cations on their surface by reason of charge deficiencies in the crystal lattice. In aqueous suspension, the adsorbed cations may exchange places with other species of cations that happen to be in the aqueous phase. Naturally occurring clays may be one or a mixture of the various types of clay minerals. The types most commonly occurring in drilling fluid clays are: montmorillonite, illite, beidillite, nontronite, saponite, altapulgite, kaolinite and halloysite. Swelling montmorillonite is the type which yields the most favorable rheological and plastering properties in a drilling fluid.

It is customary to add various other components to drilling fluids to modify or improve the properties imparted by the clay. For instance, a wide variety of chemicals are used to control the rheological properties. Various colloidal substances such as starch or carboxymethylcellulose are added to improving the plastering qualities. The density may be increased by the addition of weighting materials, notably barites, and such material may constitute a substantial portion of the drilling fluid, e. g., in the range 10–70% by weight.

Sometimes oil is used as part of the discontinuous phase. A non-aqueous liquid, such as crude oil, diesel oil, fuel oil, kerosene and the like, is emulsified into the drilling fluid by means of a suitable emulsification agent such as soaps of the fatty acids, resin acids, tall oil and the like. Up to 40% of oil, and 0.5 to 5% of emulsification agent may be used.

High temperature drilling muds prepared according to the present invention are found to have the favorable operating characteristics of lime-base muds without producing the adverse effect of high-temperature solidification. It is essential, however, that there be no appreciable amount of available calcium present in the barium hydroxide muds of the present invention. The addition of barium hydroxide to an ordinary water-base drilling mud having no lime present may not be said to prevent the solidification of the drilling mud as the mud does not solidify in the absence of lime. Likewise, the addition of barium hydroxide to a lime-base mud will not prevent the solidification thereof due to the presence of the lime. The barium hydroxide as taught by the present invention is merely added, preferably together with NaOH and a thinner, to ordinary water-base muds to prepare muds with the same characteristics as lime muds which will not solidify in high-temperature wells as do the lime-base muds. Stoichiometrically less barium hydroxide is required to produce the same degree of flocculation in the mud as compared with calcium hydroxide and a higher maximum degree of flocculation is possible with a barium hydroxide mud. The higher degree of flocculation obtainable with barium hydroxide in the mud allows the mud to hold more clays picked up in drilling and allows the mud to be used longer without adding water.

A comparison of the effect of the addition of barium hydroxide or calcium hydroxide to a drilling mud indicates that both the hydroxides react with the clay minerals in the mud. The degree of solidification shows no correlation with the neutralization of the hydroxide but depends upon the properties of the end product of these reactions, which, in turn, depend on (1) the nature of the hydroxide added, (2) the chemical status of the base clay, and (3) the nature of the clay materials.

A number of clays were selected of various clay mineral types and originating from various sources. These were mixed with water to form a water-base mud and portions of the mud were treated independently with equivalent amounts of either barium or calcium hydroxide. All samples were heated for 16 hours at 170° C. and then tested as to the degree of solidification that took place in each case. Although barium hydroxide is referred to in this test as $Ba(OH)_2$, actually its octahydrate $$Ba(OH)_2.8H_2O$$

was used in all cases. Due to the heating, the muds thickened beyond the range of the viscometer and the extent of the thickening was determined by allowing a long, tapered cone (1 inch diameter base, 3 inches high) to fall through the mud under its own weight. The data furnished thereby are considered a sufficiently accurate test of the thickening or solidification of the mud. As a guide in interpreting the results, it may be said that when the cone penetration was greater than 2 centimeters, the mud had reached the state of a thick plastic; when it was less than 2 centimeters, the mud had solidified.

Table 1

| Clay | Origin | Principal Clay Minerals | Hydroxide Added | After Heating Cone Pene., cms. | pH |
|---|---|---|---|---|---|
| No. 1 | Wyoming | Montmorillonite | Ca(OH)$_2$<br>Ba(OH)$_2$* | 1.2<br>>6.0 | |
| No. 2 | N. Texas | do | Ca(OH)$_2$<br>Ba(OH)$_2$ | 0.3<br>>6.0 | |
| No. 3 | Texas | do | Ca(OH)$_2$<br>Ba(OH)$_2$ | 0.1<br>>6.0 | 10.0<br>11.5 |
| No. 4 | Weeks Is., La. | | Ca(OH)$_2$<br>Ba(OH)$_2$ | 1.7<br>>6.0 | 10.2<br>11.4 |
| No. 5 | California | Montmorillonite, some kaolinite. | Ca(OH)$_2$<br>Ba(OH)$_2$ | 1.3<br>>6.0 | 9.9<br>11.0 |
| No. 6 | Texas | Montmorillonite | Ca(OH)$_2$<br>Ba(OH)$_2$<br>Ba(OH)$_2$+100 Ba$_2$CO$_3$ | 0.3<br>2.4<br>5.5 | 10.0<br>10.0<br>9.9 |
| No. 7 | Louisiana | Mostly montmorillonite. | Ca(OH)$_2$<br>Ba(OH)$_2$<br>Ba(OH)$_2$+100 Ba$_2$CO$_3$ | 0.3<br>4.1<br>>6.0 | 9.7<br>10.7<br>10.7 |
| No. 8 | Trinidad | Montmorillonite and some kaolinite. | Ca(OH)$_2$<br>Ba(OH)$_2$ | 0.3<br>>6.0 | 10.2<br>10.7 |
| No. 9 | Venezuela | Kaolinite and illite | Ca(OH)$_2$<br>Ba(OH)$_2$ | 1.4<br>3.9 | 10.1<br>10.5 |
| No. 10 | Indonesia | Kaolinite, Halloysite | Ca(OH)$_2$<br>Ba(OH)$_2$<br>Ba(OH)$_2$+100 Ba$_2$CO$_3$ | 0.7<br>1.4<br>4.4 | 10.1<br>9.3<br>10.0 |
| No. 11 | Illinois | Illite | Ca(OH)$_2$<br>Ba(OH)$_2$ | 1.3<br>>6.0 | 10.2<br>11.1 |

*Barium hydroxide contains 8 moles of water. 196 g. of barium hydroxide is the equivalent of 46 g. of calcium hydroxide. All samples were heated for 16 hours at 170° C.

As may be seen from the above table, the treatment of montmorillonite and illite-type clays with barium hydroxide did not cause anything approaching solidification; generally the resultant drilling muds were as thin or even thinner than before heating. Thus, in Examples 1 to 5, 7, 8 and 11, the dropping cone used in the cone test registered a penetration in each of these drilling fluids to a depth greater than 6.0 cm. With kaolinitic clays the barium hydroxide did cause marked thickening as shown by the data for samples 9 and 10, but the thickening only reached a plastic stage, while the muds treated with calcium hydroxide turned solid.

In Examples 6, 7 and 10 of Table 1, drilling muds were made using clays containing substantial amounts of native calcium. When these clays were heated with barium hydroxide, cone penetrations of 2.4 cm., 4.1 cm., and 1.4 cm., respectively, were obtained. In order to obtain the full benefit of the barium hydroxide it was necessary to add barium carbonate. When the mud samples were pretreated with 100 g./liter of barium carbonate, which reacts with calcium hydroxide to precipitate out calcium carbonate, and then heated with the barium hydroxide, the cone penetrations were 5.5 cm., more than 6.0 cm. and 4.4 cm., respectively. The treatment of these clays further tended to show that the presence of the calcium ion is the principal cause of mud solidification which can be overcome by employing barium hydroxide rather than calcium hydroxide as a mud conditioner. By comparison, it may be seen from Table 1, that when all of the muds were treated with calcium hydroxide they all solidified yielding cone penetration values of from 0.3 to 1.4 centimeters.

In the drilling muds of Table 1, no quebracho or other substances were added which normally reduce solidification. The data show that the substitution of barium hydroxide for calcium hydroxide minimizes the solidification of drilling muds with clays of any origin, and eliminates it with clays from areas where the formations are composed of predominantly montmorillonite or illite-type clays and with substantial improvement in the drilling muds being realized in areas where kaolinitic-type clays are used. It is to be emphasized that the treatment of drilling muds with barium hydroxide is not an inhibitive type of treatment whose effects tend to wear off with age or changing conditions, but is rather a treatment where the harmful substance (calcium ions) is eliminated and replaced by a beneficial one (barium ions).

To show further the superiority of a barium-hydroxide mud over lime-base mud several of the muds shown in Table 1 containing different types of clay were treated with a thinner in an attempt to thin the muds, and were heated for 16 hours at 170° C. after the thinner had been added. In all cases, the barium hydroxide mud had a cone penetration of more than 6.0 centimeters as shown on the Table 2, and was substantially more fluid than a lime-base mud made with the same clay. In Examples 3 and 5 of Table 2, where cone penetrations of both the lime-base muds and barium hydroxide muds were greater than 6.0 centimeters, the shear strength of the respective muds were also measured. The data show that the initial shear rate of the calcium hydroxide mud was substantially greater than that of the barium hydroxide muds, thus, indicating much thicker and more viscous muds.

In order to compare the properties of a barium hydroxide mud with a lime-base mud, when mixed with an amount of NaOH and thinner required to provide normal operating characteristics, two 84 lb./cu. ft. muds were made which contained the montmorillonite type clay (No. 7) from Louisiana. Barium hydroxide and calcium hydroxide in amounts necessary to give approximately the same degree of flocculation were added to the two muds together with sodium hydroxide and quebracho in the amounts shown in Table 3. In addition, since the clay used was a natural calcium-bearing clay, 27 g./liter of barium carbonate were added to precipitate the calcium ions from the barium hydroxide mud. As may be seen from Table 3, the initial and five-minute shear strengths of the two muds were identical as were filtration properties, the stability of the muds to solids and their stability to salt contamination. Thus, the two muds, the barium and calcium hydroxide muds, had substantially identical properties except for their high-temperature stability, in which regard the barium hydroxide mud was definitely superior to the lime-base mud. In comparing the high-temperature stability, the shear strength of the two muds was measured after three days, with the initial shear of the barium hydroxide mud being 100 d./cm.$^2$ as contrasted to the 278 d./cm.$^2$ of the lime-base mud. To duplicate more closely operating practices in the field, Table 2

| Base Mud | Composition (g./liter) | | | | After 16 Hours at 170° C. | |
|---|---|---|---|---|---|---|
| | NaOH | Thinner | Hydroxide | Starch | Cone Pene. (cm.) | Initial Shear (dynes/cm.$^2$) |
| No. 3 | 10 | 10 Quebracho | 20 Ca(OH)$_2$ | 0 | 3.3 | |
| | 10 | ___do___ | 42 Ba(OH)$_2$ | 0 | >6.0 | |
| No. 3 | 12 | 14 Quebracho | 50 Ca(OH)$_2$ | 0 | 2.0 | |
| | 11 | 12 Quebracho | 105 Ba(OH)$_2$ | 0 | >6.0 | |
| No. 11 | 6 | 6 "Carbonox"* | 14 Ca(OH)$_2$ | 6 | >6.0 | 461 |
| | 6 | ___do___ | 20 Ca(OH)$_2$ | 6 | >6.0 | 20 |
| No. 11 | 6 | ___do___ | 39 Ca(OH)$_2$ | 6 | 4.4 | |
| | 6 | ___do___ | 138 Ba(OH)$_2$ | 6 | >6.0 | 20 |
| No. 7 | 10 | 10 Quebracho | {15 Ca(OH)$_2$, 20 Ba(OH)$_2$, 27 BaCO$_3$} | 0 | >6.0 | 278 |
| | 10 | ___do___ | | 0 | >6.0 | 100 |
| No. 7 | 15 | ___do___ | 50 Ca(OH)$_2$ | 0 | 2.0 | |
| | 15 | ___do___ | 196 Ba(OH)$_2$ | 0 | >6.0 | 20 |

*A lignite-containing mud thinner.

where extra amounts of barium hydroxide or calcium hydroxide are often added to the muds, said two muds were additionally treated with 176 grams/liter of barium hydroxide and 35 grams/liter of calcium hydroxide, respectively. After heating for 16 hours at 70° C. and 170° C., the shear strengths of the muds were again measured. The barium hydroxide mud had an initial shear of 61 d./cm.$^2$. At the higher temperature of 170° C., the shear strength was further reduced, as indicated by an initial shear of 36 d./cm.$^2$. On the other hand, heating of the lime-base mud merely to 70° C. caused the mud to solidify so that no viscosity reading could be obtained and a cone test of the mud gave a reading of 2.0 centimeters.

Table 3

| | 84 lb./cu. ft. No. 7 Mud Heated with 10 NaOH, 10 Quebracho, 20 Ba(OH)$_2$·8 H$_2$O, 27 Ba CO$_3$ (g./liter) | Same Mud Heated, 10 NaOH, 10 Quebracho, 15 Ca(OH)$_2$ (g./liter) |
|---|---|---|
| Rheology: | | |
| Initial shear strength | 0 | 0. |
| 5 Minute shear strength | 0 | 0. |
| pH of Mud | 12.6 | 12.3. |
| Filtration: | | |
| API Filtrate | 11.5 cc | 15 cc. |
| Cake permeability | 3.4 md | 5.9 md. |
| Stability to Solids | 11 g. percent | 14 g. percent. |
| Stability to Salt | 157 d./cm.$^2$ | 177 d./cm.$^2$ |
| High Temperature Stability, Initial shear after 3 days. | 100 d./cm.$^2$ (65 g.) | 278 d./cm.$^2$ (215 g.). |
| 176 g./liter extra Ba(OH)$_2$ and 5 g./liter extra NaOH added: | | 35 g./liter extra Ca(OH)$_2$ and 5 g./liter extra NaOH: Cone penetration 2.0 cm. |
| After heating at 70° C., initial shear. | 61 d./cm.$^2$ | |
| After heating at 170° C., initial shear. | 36 d./cm.$^2$ | |

In another test, the normal operating properties and the high-temperature stabilities of a calcium hydroxide and a barium hydroxide mud made with No. 3 clay and made up to a weight of 74 lb./cu. ft. were compared.

Table 4

| | 74 lb./cu. ft. No. 3 Mud Heated with 11 NaOH, 12 Quebracho, 42 Ba(OH)$_2$·8 H$_2$O (g./liter) | Same Mud Heated with 12 NaOH, 14 Quebracho, 20 Ca(OH)$_2$ (g./liter) |
|---|---|---|
| Rheology: | | |
| Initial shear strength | 0 d./cm.$^2$ (0 g.) | 6 d./cm.$^2$ (6 g.). |
| 5 minute shear strength | 25 d./cm.$^2$ (38 g.) | 50 d./cm.$^2$ (50 g.). |
| Stability to solids | 24% | 18%. |
| High Temperature Stability (108 g./liter extra Ba(OH)$_2$ added): | | (25 g./liter extra Ca(OH)$_2$) |
| Cone penetration | >6.0 cm | 2.1 cm. |
| | Above mud heated with 9 g./liter starch (as a 5% solution) | Above mud heated with 3 g./liter starch |
| Rheology: | | |
| Initial shear strength | 0 d./cm.$^2$ | 18 d./cm.$^2$ (27 g.). |
| 5 minute shear strength | 6 d./cm.$^2$ (6 g.) | 120 d./cm.$^2$ (75 g.). |
| | Above mud loaded to 120 lb./cu. ft. with barites | Above mud loaded to 120 lb./cu. ft. with barites |
| Initial shear strength | 2 d./cm.$^2$ (2 g.) | 52 d./cu.$^2$ (52 g.). |
| 5 minute shear strength | 32 d./cm.$^2$ (40 g.) | 370 d./cu.$^2$ (310 g.). |

From the table, it may be seen that the initial and five minute shear strengths of the two muds were very low with the values of lime-base being at least twice as great as the barium hydroxide mud. When extra barium and calcium hydroxide were added to the two muds for the high-temperature stability test, both muds thickened but the barium hydroxide mud was still fluid with a cone penetration of greater than 6.0 centimeters while the lime-base mud had substantially solidified with a cone penetration reading of 2.1 centimeters. Portions of the two muds prior to the high-temperature stability test were treated with small quantities of starch. Viscosity readings taken of the two muds after the starch addition showed that the viscosity of the barium hydroxide mud had reduced slightly while the viscosity of the lime-base had increased appreciably. Further loading of the starch-treated portions of mud with weighting materials until the muds weighed 120 lb./cu. ft. increased the viscosities of the barium hydroxide mud slightly while the viscosity of the lime-base mud more than trebled.

In a further test of the high-temperature stability characteristics of a barium hydroxide mud, two portions of a 125 lb./cu. ft. mud taken from a well in Weeks Island, Louisiana, were treated with barium hydroxide and calcium hydroxide in amounts required to give approximately the same degree of flocculation respectively, together with thinning agents and other chemicals. Shear strength measurements during the high-temperature stability tests indicated that while both muds remained fluid, the initial shear strength of the barium hydroxide mud increased from 11 to less than 20 d./cm.$^2$ on heating, while the initial shear strength of the lime-base mud increased from 7 to 461 d./cm.$^2$. To test more severe conditions which might arise in the field, excess amounts of barium and calcium hydroxides were added to their respective muds. The initial shear of the barium hydroxide mud did not rise above 20 d./cm.$^2$, and while the shear strength could not be measured on the lime-base mud, a cone penetration reading of 4.5 cm. showed that the mud was a thick plastic mass.

with 18 g./liter of sodium chloride added as a 10% solution to the mud. In the high temperature stability test the muds were heated at 170° C. (338° F.) for 16 hours. The cone penetration test has been previously described above. When the muds did not thicken sufficiently to obtain cone readings, initial shear readings were taken to compare the effects.

The foregoing examples show that a drilling mud incorporating small amounts of barium hydroxide together with sodium hydroxide and a thinner therein may be used in drilling high-temperature wells with vastly superior results than conventional lime-base mud. The minimum temperature at which lime-base muds show severe solidification is about 150° C., but milder effects such as extensive thickening can be noticed at temperatures as low as 110° C. Thus, the present barium hydroxide muds are vastly superior for drilling in high temperature wells at any time the temperature exceeds 110° C. while above 150° C., the present muds are the only type having a high solids content which will not set up and solidify when allowed to stand without circulation or agitation for long periods.

In operation, the present barium hydroxide mud is circulated down a drill string and through the drill bit to the bottom of a well borehole in the conventional manner well known to the art. As the mud returns up the borehole to the surface, an impervious sheath is formed on the walls of the borehole preventing the suspending medium of the mud from flowing into the formations traversed. When using the present barium hydroxide mud in high temperature wells, the drilling operations may be interrupted for long periods without the fear of the mud solidifying at the bottom of the well.

In well-completion operations, the drilling mud is often left in the annulus between the production string and the well casing for the wall of the borehole at all times. By employing a barium hydroxide mud according to the present invention, there is no setting up of the mud in high temperature wells.

The amount of barium hydroxide to be added to a

Table 5

| 120 lb./cu. ft. Mud No. 11 from Weeks Island, La., Treated with 6 NaOH, 6 "Carbonox*," 20 Ba(OH)$_2$·8 H$_2$O 20 Starch (g./liter) Plus Barites as a Weighting Agent | | Same Mud Treated with 6 NaOH 6 "Carbonox*," 20 Starch 14 Ca(OH)$_2$ (g./liter) |
|---|---|---|
| Rheology: | | |
| Initial shear strength | 11 d./cm.$^2$ (20 g.) | 7 d./cm.$^2$ (7 g.). |
| 5 Minutes shear strength | 20 d./cm.$^2$ (33 g.) | 18 d./cm.$^2$ (27 g.). |
| High Temperature Stability, Initial shear strength. | <20 d./cm.$^2$ (33 g.) | 461 d./cm.$^2$ (410 g.). |
| (108 g./liter extra Ba(OH)$_2$ added) Initial shear strength. | 20 d./cm.$^2$ (33 g.) | 25 g./liter extra Ca(OH)$_2$: Cone penetration 4.5 cm. |

*A lignite-containing mud thinner.

The above tests were all conducted under the following conditions. Except for barium carbonate, all the chemicals were added to the muds simultaneously. Barium carbonate was well stirred into a mud before the other chemicals were added. All muds were heated 16 hours at 70° C. before testing.

The rheology tests were made using a quadrant viscometer. The values obtained with this viscometer are comparative with those obtained by a Stormer viscometer. The figures in parentheses after the shear strength values on Tables 3, 4 and 5 are the corresponding Stormer values in grams. The stability to solids test is a measure of the maximum solids content which the mud will contain. The test method comprises adding clay (a Texas bentonite was used), and cutting back the resultant rise in the viscosity of the mud with sodium quebracho and repeating until the mud reached the plastic stage. The figure indicates the grams of clay per hundred cubic centimeters of mud required to reach this stage.

The figures given in the stability to salt test are the initial shear strength after the muds have been treated water-base mud or to an oil-in-water emulsion according to the present invention is not subject to a precise determination, as it is dependent upon the operating characteristics of the mud such as the rheological properties, viscosity solids ratio, filtration characteristics, etc., that are required under the operating conditions at the moment for the well being drilled. However, it is quite customary in well drilling operations to test the mud in the well at regular intervals and to determine the amount of barium hydroxide to add to a mud in order to achieve the desired characteristics of the mud. Each operator practicing this invention will add varying amounts of barium hydroxide to the mud in accordance with the particular well that he is drilling or is completing at the time. Since operating costs are an important factor in drilling operations, an operator will only add the minimum amount to a mud that will give him the optimum results. The amount of barium hydroxide to be added to a water-base mud in practice varies in the range of from 1 to 15 lbs. per barrel of mud. Very small amounts need be added to a mud if the mud is being used for completion purposes only. The amount of barium hydroxide used may also depend upon the type of clay being used in the mud. Sodium hydroxide and a thinner such as quebracho may be added in amounts greater or smaller than the barium hydroxide used in order to give the mud the desired gel, viscosity and filtration characteristics. The amount of sodium hydroxide present should preferably be in excess of the amount needed to react with the thinner. Regardless of whether only one-half pound of barium hydroxide per barrel of mud is used, or more, a barium hydroxide mud will not solidify in a high temperature well. It is necessary, however, that there be no appreciable amount of calcium present in the mud.

In some circumstances, it may be more convenient to add the barium in the form of barium oxide which would then form barium hydroxide with the water in the mud. In the event that there are calcium ions present in the mud, the mud is preferably treated with a chemical such as barium carbonate to precipitate the calcium ions prior to the addition of barium hydroxide. In a like manner, the present barium hydroxide muds may not maintain their desired characteristics if a substantial amount of sulfate ions are present in the mud. The most common occurrence of excessive sulfate contamination arises when drilling through anhydride (calcium sulfate). In these instances, there are several methods of combating sulfate contamination such as by the addition of barium carbonate to remove the sulfate ions as barium sulfate. The U. S. patent to W. E. Bergman, 2,529,760 of November 14, 1950, teaches the pretreatment of water-base muds with barium hydroxide to precipitate contaminating sulfate ions. There is no connection, however, between the action of barium hydroxide in precipitating out the sulfate ions and the fact that barium hydroxide muds do not solidify. If barium hydroxide is added in increasing amounts to a mud which contains sulfate ions, the first reaction that takes place is the precipitation of the barium sulfate and this continues until all the sulfate has been removed.

Thus, in the event one of the present barium hydroxide muds becomes contaminated with sulfate ions, it would lose its desirable characteristics as a drilling mud since the barium hydroxide present would be converted to barium sulfate. Hence, in order to retain its desirable drilling characteristics, a barium hydroxide mud according to the present invention would again have to be supplied with an extra amount of barium hydroxide to yield a good drilling mud that would not solidify in high-temperature wells.

Since a lime-base mud is considerably cheaper than a barium hydroxide mud, it may be advantageous to drill a substantial part of a well using a lime-base mud and to convert the lime-base mud to a barium hydroxide mud when the well gets to a depth that the bottom hole temperatures may class the well as a high-temperature well. In order to convert a lime-base mud to a barium hydroxide mud substantially all of the lime must be removed if solidification is to be prevented in a high-temperature well. This conversion may be accomplished by adding an acid such as, for example, oxalic acid, to the mud to neutralize the calcium hydroxide. Thereafter, the desired amount of barium hydroxide may be added to the mud.

I claim as my invention:

1. A process for drilling a high-temperature well comprising drilling the well with well drilling tools, circulating in the well a water-base lime-free drilling mud containing colloidal particles of clayey material suspended in sufficient water to render the same circulatable, and increasing the solids capacity of said drilling mud by admixing with said mud and interacting therewith barium hydroxide in an amount of from 1 to 15 pounds per barrel in excess of that which would react with any sulfate ions present in the mud, said barium hydroxide being sufficient to raise the solids capacity of the mud and prevent the solidification thereof when said muds are exposed to temperatures above 110° C., said amount of barium hydroxide being insufficient to increase the viscosity of said mud to such an extent as to render said drilling mud uncirculatable.

2. A process for drilling a high-temperature well comprising drilling the well with well drilling tools, circulating in the well a water-base lime-free drilling mud containing colloidal particles of clayey material suspended in sufficient water to render the same circulatable, and increasing the solids capacity of said drilling mud by admixing with said mud and interacting therewith from 1 to 15 pounds of barium hydroxide per barrel of mud in excess of that which would precipitate any sulfate ions present in the mud, said barium hydroxide being added to raise the solids capacity of the mud and prevent the solidification thereof when said muds are exposed to temperatures above 110° C., said amount of barium hydroxide being insufficient to increase the viscosity of said mud to such an extent as to render said drilling uncirculatable.

3. A water-base lime-free drilling mud for high-temperature wells comprising, in combination, sufficient water to maintain the mud as a fluid, sufficient clayey material to form a filter cake on the wall of the well and barium hydroxide in an amount of from 1 to 15 pounds per barrel in excess of that which would react with sulfate ions present in the mud, said barium hydroxide being sufficient to increase the solids content capacity of the mud and prevent solidification of the mud at high temperatures but insufficient in amount to increase the viscosity of said drilling mud to an extent that it cannot be circulated.

4. An oil-in-water lime-free drilling emulsion for high-temperature wells comprising, in combination, a minor amount of oil emulsified in a predominant amount of water, sufficient clayey material to form a filter cake on the wall of the well and barium hydroxide in an amount of from 1 to 15 pounds per barrel in excess of that which would react with any sulfate ions present in the mud, said barium hydroxide being sufficient to increase the solids content capacity of the mud without causing solidification of the mud at high temperatures but insufficient in amount to increase the viscosity of said drilling mud to an extent that it cannot be circulated.

5. A water-base lime-free drilling mud for use in wells having bottom-hole temperatures of at least 110° C., said mud being substantially free from contaminating calcium ions and comprising sufficient water to maintain the mud as a fluid, sufficient clayey material to form a filter cake on the wall of the well, sufficient weighting material to overcome formation pressures encountered, and from 1 to 15 pounds of barium hydroxide per barrel of mud in excess of that which would precipitate any sulfate ions present in the mud, said barium hydroxide being added, said mud being characterized by its ability to remain in a fluid condition when subjected to high temperatures over long periods.

6. A water-base lime-free drilling mud for use in wells having bottom-hole temperatures of at least 110° C., said mud being substantially free from contaminating calcium and sulfate ions and comprising sufficient water to maintain the mud as a fluid, sufficient clayey material to form a filter cake on the wall of the well, sufficient weighting material to overcome formation pressures encountered, and from 1 to 15 pounds of barium hydroxide per barrel of mud in excess of that which would precipitate any sulfate ions present in the mud, said barium hydroxide being added, said mud being characterized by its ability to remain in a fluid condition when subjected to high temperatures over long periods.

7. An oil-in-water lime-free drilling emulsion mud for use in wells having bottom-hole temperatures of at least 110° C., said mud being substantially free from contaminating calcium and sulfate ions and comprising sufficient water with a minor amount of oil emulsified therein to maintain the mud as a fluid, sufficient clayey material to form a filter cake on the wall of the well, sufficient weighting material to overcome formation pressures encountered, and from 1 to 15 pounds of barium hydroxide per barrel of mud in excess of that which would precipitate any sulfate ions present in the mud, said barium hydroxide being added, said mud being characterized by its ability to remain in a fluid condition when subjected to high temperatures over long periods.

8. A method of completing a high-temperature well which comprises inserting a casing into the well borehole, inserting a production tubing within said casing, and introducing into the annulus formed between said casing and said tubing a water-base lime-free drilling fluid containing barium hydroxide in an amount of from 1 to 15 pounds per barrel in excess of that which would react with any sulfate ions present in the mud, said barium hydroxide being sufficient to provide suitable operating characteristics of said mud, said mud being characterized by its ability to remain fluid when said mud stands stagnant at high temperatures.

9. A method of completing a high-temperature well which comprises inserting a casing into the well borehole, inserting a production tubing within said casing, and introducing into the annulus formed between said casing and said tubing an oil-in-water lime-free drilling emulsion containing barium hydroxide in an amount of from 1 to 15 pounds per barrel in excess of that which would react with any sulfate ions present in the mud, said barium hydroxide being sufficient to prevent the solidification of the stagnant mud when said mud is subjected to high temperatures.

10. In the treatment during the course of drilling of aqueous mud laden fluids subject to solidification upon standing at high temperatures, the process comprising converting any soluble calcium ions present to a substantially insoluble form and subsequently adding at least 1 pound of barium hydroxide per barrel of mud in excess of that which would precipitate any sulfate ions present in the mud, said barium hydroxide being added to prevent the solidification of the mud in the well when subjected to temperatures above 110° C.

References Cited in the file of this patent

UNITED STATES PATENTS

| | | |
|---|---|---|
| 2,393,165 | Hoeppel | Jan. 15, 1946 |
| 2,393,166 | Hoeppel | Jan. 15, 1946 |
| 2,529,760 | Bergman | Nov. 14, 1950 |
| 2,692,856 | Litman | Oct. 26, 1954 |

OTHER REFERENCES

Weichert et al.: Effect of Oil Emulsion Mud on Drilling, article in The Petroleum Engineer, vol. 22, Issue 12, pages B16, B18, B35, B36, and B38, Nov. 1950.

Drilling Mud: Dec. 1952, 29 pages, published by Baroid Sales Div. of National Lead Company, Houston, Texas.